United States Patent
Kaminosono

(10) Patent No.: US 7,340,154 B2
(45) Date of Patent: Mar. 4, 2008

(54) TELEVISION SET EMBEDDED WITH DVD PLAYER

(75) Inventor: Takeshi Kaminosono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 593 days.

(21) Appl. No.: 10/989,424

(22) Filed: Nov. 17, 2004

(65) Prior Publication Data

US 2005/0141884 A1    Jun. 30, 2005

(30) Foreign Application Priority Data

Nov. 18, 2003  (JP)  ............ 2003-272543 U

(51) Int. Cl.
*H04N 5/91* (2006.01)
*H04N 5/00* (2006.01)

(52) U.S. Cl. ........................ 386/95; 386/125
(58) Field of Classification Search ............. None
See application file for complete search history.

(56) References Cited

U.S. PATENT DOCUMENTS 5,572,260 A * 11/1996 Onishi et al. ............ 348/460
7,054,804 B2 * 5/2006 Gonzales et al. ......... 704/8
2003/0021586 A1 * 1/2003 Suh ........................ 386/95
2004/0252979 A1 * 12/2004 Momosaki et al. ....... 386/96

FOREIGN PATENT DOCUMENTS

| JP | 6-217199 | 8/1994 |
| JP | 2002-247498 | 8/2002 |
| WO | WO 2006051482 A1 * | 5/2006 |

* cited by examiner

*Primary Examiner*—John Miller
*Assistant Examiner*—Heather R. Jones
(74) *Attorney, Agent, or Firm*—Morgan, Lewis & Bockius LLP

(57) ABSTRACT

A television set include a DVD-IC 20 for outputting a composite signal a containing subtitle information and closed caption information, a TV-IC 10 for outputting an OSD signal b based on the closed caption information identified in the composite signal a, and a serial bus connecting the DVD-IC 20 and the TV-IC 10. The DVD-IC 20 informs the TV-IC 10 of the setting status of subtitle display based on the subtitle information in a DVD player. The TV-IC 10, if the setting of subtitle display based on the subtitle information in the DVD player is ON, turns OFF the setting of subtitle display based on the closed caption information in the television receiver, thereby prohibiting an OSD signal b from being outputted.

6 Claims, 6 Drawing Sheets

TELEVISION SET EMBEDDED WITH DVD PLAYER

BACKGROUND OF THE INVENTION

1. Field of the Invention

The present invention relates to a television set embedded with a DVD (Digital Versatile Disk) player, and more particularly to a technology for prohibiting subtitles based on subtitle information from being superposed on those based on closed caption information on a screen.

2. Description of the Related Art

A DVD player embedded type television set (a television set embedded with a DVD player) is a video reproducing apparatus that both serves as a television set and a DVD player. The DVD player embedded type television set has an advantage that it is more compact than a system in which a separate DVD player and a television set are connected with each other by a cable. The contents recorded on a DVD are reproduced and displayed on a television screen. Subtitle information and closed caption information as well as main video information are recorded on the DVD. The subtitle information is used to display the subtitles in the case of the contents such as the movies, and includes subtitle data corresponding to plural languages such as Japanese, English, French, and Spanish; the subtitles expressed in the language designated by a user can be displayed in superposition on a main image or picture. The closed caption information has been inherently introduced for hearing-impaired people and is inserted during a vertical blanking period of a video signal to display the same contents as a speech sound by the subtitles. However, unlike the subtitle information, the language of the subtitles displayed on the basis of the closed caption information is limited to English. The subtitle information and closed caption information are disclosed in JP-A-2002-247498 and in JP-A-6-217199.

SUMMARY OF THE INVENTION

As described above, both the subtitle information and the closed caption information are employed to display the characters on the screen. In the case of the DVD containing the recorded contents of a movie, the subtitle contents of the subtitle information and closed caption information are the same. On the other hand, in the television receiver or DVD player, whether or not the subtitles are displayed can be set by a remote controller. More specifically, in the case of the television receiver, the presence or absence of display of the subtitles based on the closed caption information can be selected, whereas in the case of the DVD player, the presence or absence of display of the subtitles based on the subtitle information can be selected. Therefore, where the setting of subtitle display based on the subtitle information is ON in the DVD player, if the setting of subtitle display based on the closed caption information in the television receiver is ON, the closed caption information contained in the composite signal of the DVD transferred from the DVD player to the television receiver will be recognized by the television receiver and extracted for display. Thus, on the display screen, both the subtitles based on the subtitle information and those based on the closed caption information will be displayed. If these subtitles are superposed as illustrated in FIG. 6, they become very difficult to see. Incidentally, reference numeral 30 denotes a main image or picture; 31 denotes subtitles based on the subtitle information (in Japanese); and 32 denotes the subtitles based on the closed caption information (in English).

On the other hand, in JP-A-2002-247498, on the basis of the information set by a user, the subtitles based on either of the subtitle information and closed caption information are automatically displayed. The document JP-A-2002-247498 discloses a technique for giving priority to the subtitle information to display the closed caption information only while the subtitle information is not displayed, or otherwise display the subtitle information only while the closed caption information is not displayed. The document JP-A-6-217199 discloses a technique for changing the scanning lines before and after the caption information into blanking signals to conceal the subtitles based on the subtitle information, thereby displaying only the subtitles based on the caption information.

In the technique described in JP-A-2002-247498, the television receiver and the DVD player are separately provided, and the selection of the subtitles to be displayed on the screen is performed in the DVD player. The selection, however, is carried out on the basis of the information set by a user. For the reason, the user must set the subtitles to be displayed. In addition, the display processing program in the DVD player will be complicate. Further, in the technique described in JP-A-6-217199, the processing of changing the scanning lines into the blanking signals is required, and the circuit for carrying out the processing is also required, thereby complicating the configuration.

The present invention has been accomplished in order to solve the above described problem. One of objects of the invention is to provide a DVD player embedded type television set which can automatically display only the subtitles based on subtitle information without setting by a user and through a simple configuration.

According to a first aspect of the invention, there is provided a television set embedded with a DVD player, which plays a DVD in which subtitle information and closed caption information are both recorded, the television set including: a display device; a first processor that generates, from a signal read from the DVD, a composite signal containing both of the subtitle information and the closed caption information; a second processor that extracts the closed caption signal from the composite signal, and generates an OSD signal from the extracted closed caption signal; a video signal processor that generates a display signal from the composite signal and outputs the display signal to the display device; and a data communication bus that connects the first processor and the second processor, wherein the first processor informs the second processor through the data communication bus whether or not a setting for displaying a subtitle based on the subtitle information is turned on, wherein the second processor turns off a setting for displaying a subtitle based on the closed caption information to prohibit outputting the OSD signal when informed by the first processor that the setting for displaying the subtitle based on the subtitle information is turned on, wherein the first processor is included in a micro chip that includes a peripheral circuit that performs signal processing for the composite signal, and wherein the second processor is included in a microchip that includes a peripheral circuit that performs signal processing for the signal read from the DVD.

According to a second aspect of the invention, there is provided a television set embedded with a DVD player, which plays a DVD in which subtitle information and closed caption information are both recorded, the television set including: a first processor that generates, from a signal read from the DVD, a composite signal containing both of the subtitle information and the closed caption information; a second processor that extracts the closed caption signal from the composite signal, and generates an OSD signal from the extracted closed caption signal; and a data communication bus that connects the first processor and the second processor, wherein the first processor informs the second processor through the data communication bus whether or not a setting for displaying a subtitle based on the subtitle information is turned on, and wherein the second processor turns off a setting for displaying a subtitle based on the closed caption information when informed by the first processor that the setting for displaying the subtitle based on the subtitle information is turned on.

BRIEF DESCRIPTION OF THE DRAWINGS

The above objects and advantages of the present invention, will become more apparent by describing preferred exemplary embodiments thereof in detail with reference to the accompanying drawings, wherein.

DETAILED DESCRIPTION OF THE PREFERRED EMBODIMENTS

Referring now to the accompanying drawings, a description will be given in detail of preferred embodiments of the invention.

Figure 1:
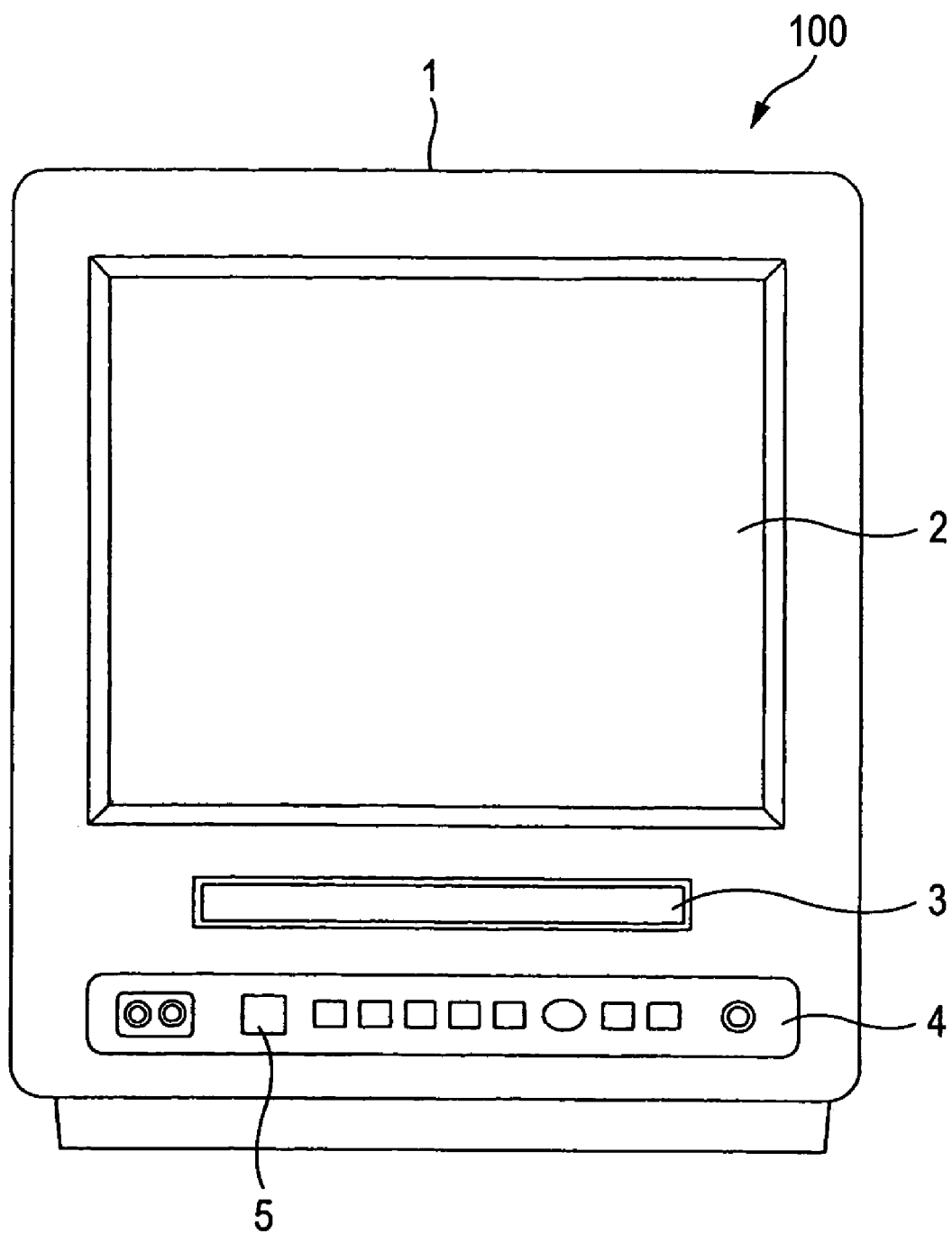
FIG. 1 is a front appearance view showing an exemplary DVD player embedded type television set according to the invention.

FIG. 1 is a front appearance view showing an exemplary DVD player embedded type television set according to the invention. In FIG. 1, reference numeral 1 denotes a body of a DVD integral television set 100 on the front face of which a display 2 constructed of a CRT (cathode ray tube) is provided. Reference numeral 3 denotes a tray for a DVD (DVD tray) provided beneath the display 2, the DVD tray being used to insert/eject the DVD placed thereon. Reference numeral 4 denotes an operation panel provided beneath the tray 3. The operation panel 4 is provided with various switches or jacks and also with a remote controller reception segment for receiving a signal from a remote controller (not shown).

Figure 2:
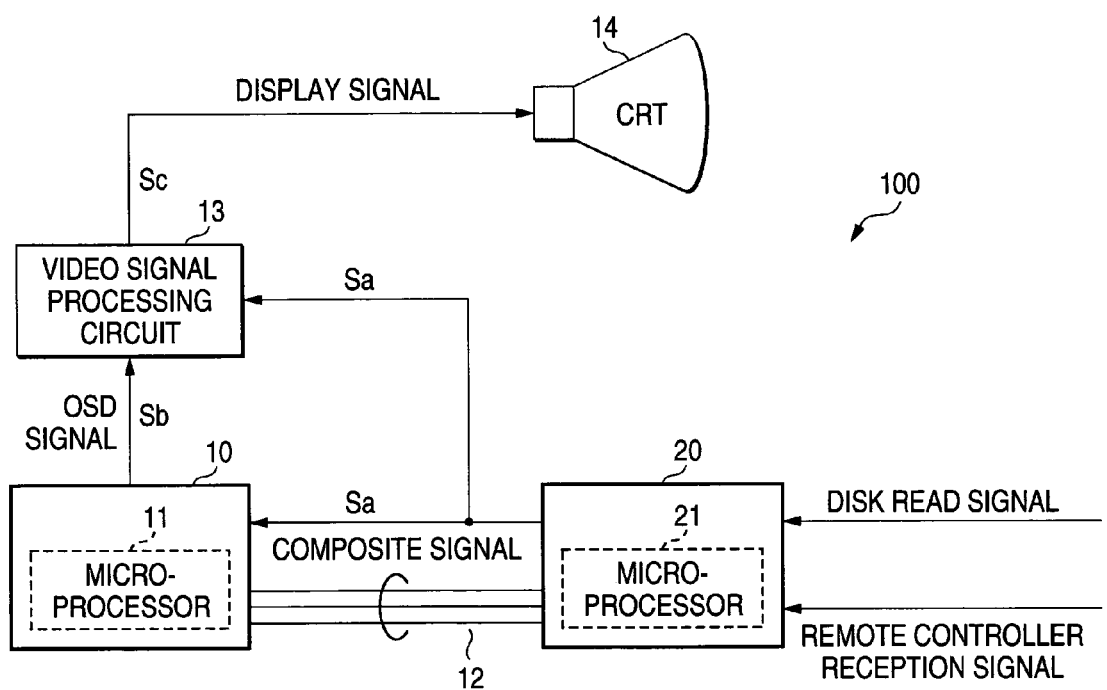
FIG. 2 is an electric block diagram of the DOD player embedded type television set according to the invention.

FIG. 2 is an electric block diagram of the DVD integral type television 100 according to the invention. It should be noted that only the blocks related to the invention are illustrated. In FIG. 2, reference numeral 10 denotes an IC for a television (referred to as TV-IC) for processing signals in a television receiver; 11 a microcomputer provided in the TV-IC 10; 20 an IC for a DVD (referred to as DVD-IC); 21 denotes a microcomputer provided in the DVD-IC 20; and 12 denotes a data communication bus connecting the microcomputers 11 and 21. The data communication bus 12 is constructed of a serial bus. The microcomputers 11 and 21 permit a bi-directional communication through the serial bus 12.

The DVD-IC 20 outputs a composite signal Sa on the basis of a disk read signal read from the DVD. The composite signal Sa contains subtitle information and closed caption information as well as main video information. The composite signal Sa is supplied to the TV-IC 10 and also to a video signal processing circuit (video signal processor) 13. The TV-IC 10 identifies the closed caption information in the composite signal Sa outputted from the DVD-IC 20 and outputs an OSD (On Screen Display) signal Sb on the basis of the closed caption information. The OSD signal Sb is supplied to the video signal processing circuit 13. The video signal processing circuit 13 processes the composite signal Sa outputted from the DVD-IC 20 and the OSD signal b outputted from the DVD-IC 20, thereby outputting a display signal Sc. The display signal Sc is supplied to the CRT 14; on the screen of the display 2 (FIG. 1) constructed of the CRT 14, subtitles as well as an image will be displayed.

An explanation will be given of the operation of the subtitle display in the DVD player embedded type television set having the configuration described above. The microcomputer 11 makes a request of the microcomputer 21 to inform the setting status of subtitle display based on the subtitle information in the DVD player at regular intervals through the serial bus 12. The microcomputer 21, when it receives the request, informs the microcomputer 11 of the setting status of subtitle display based on the subtitle information on the basis of the signal from the remote controller received by the remote controller reception segment 5 (FIG. 1); the setting status being represented by one-bit data. For example, where the subtitle display has been set at ON (the subtitles are displayed) by the remote controller, "1" is transferred from the microcomputer 21 to the microcomputer 11 through the serial bus 12. On the other hand, where the subtitle display has been set at OFF (the subtitles are not displayed), "0" is transferred from the microcomputer 21 to the microcomputer 11 through the serial bus 12.

When the microcomputer 11 on the television receiver receives a notice of the setting status of subtitle display based on the subtitle information from the microcomputer 21 in the DVD, the microcomputer 11 determines whether the setting is ON or OFF. If the setting of subtitle display is ON, the microcomputer 11 determines whether the setting of subtitle display based on the closed caption information in the television receiver is ON or OFF. If the setting is ON, the microcomputer 11 turns OFF the setting of subtitle display based on the closed caption information to prohibit the OSD signal Sb from the TV-IC 10. As a result, only the composite signal Sa outputted from the DVD-IC 20 is supplied to the video signal processing circuit 13. The video signal processing circuit 13 creates the display signal Sc on the basis of the main video information and subtitle information contained in the composite signal Sa. The display signal c is supplied to the CRT 14; on the display 2, the subtitles based on the subtitle information as well as the image will be displayed.

In the embodiment described above, the microcomputer 21 serves as a first processor that generates, from a signal read from the DVD, a composite signal containing both of the subtitle information and the closed caption information, the first processor that informs the second processor through the data communication bus whether or not a setting for displaying a subtitle based on the subtitle information is turned on. In the embodiment, the microcomputer 11 serves as a second processor that extracts the closed caption signal from the composite signal, and generates an OSD signal from the extracted closed caption signal, the second processor that turns off a setting for displaying a subtitle based on the closed caption information when informed by the first processor that the setting for displaying the subtitle based on the subtitle information is turned on.

In the embodiment, the microcomputer 21 is included in a microchip (DVD-IC 20) that includes a peripheral circuit that performs signal processing for the composite signal. The microcomputer 11 is included in a microchip (TV-IC 10) that includes a peripheral circuit that performs signal processing for the signal read from the DVD.

Figure 3:
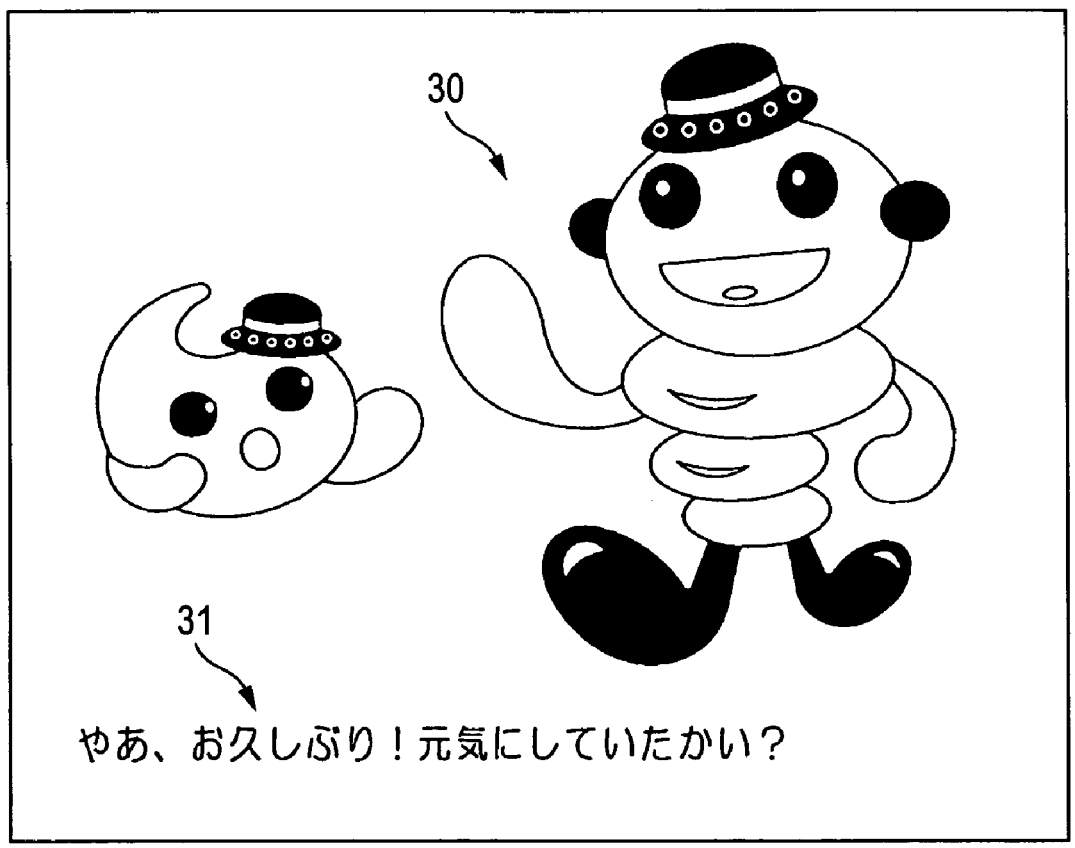
FIG. 3 shows an example of the image and subtitles displayed on the screen of the display.

FIG. 3 shows an example of the image and subtitles displayed on the screen of the display 2. In FIG. 3, only the subtitles 31 (here, Japanese) based on the subtitle information as well as a main image 30 are displayed. The subtitles (English) based on the closed caption information are not displayed. A phenomenon of difficulty of seen owing to superposition of two kinds of subtitles does not occur.

Figure 4:
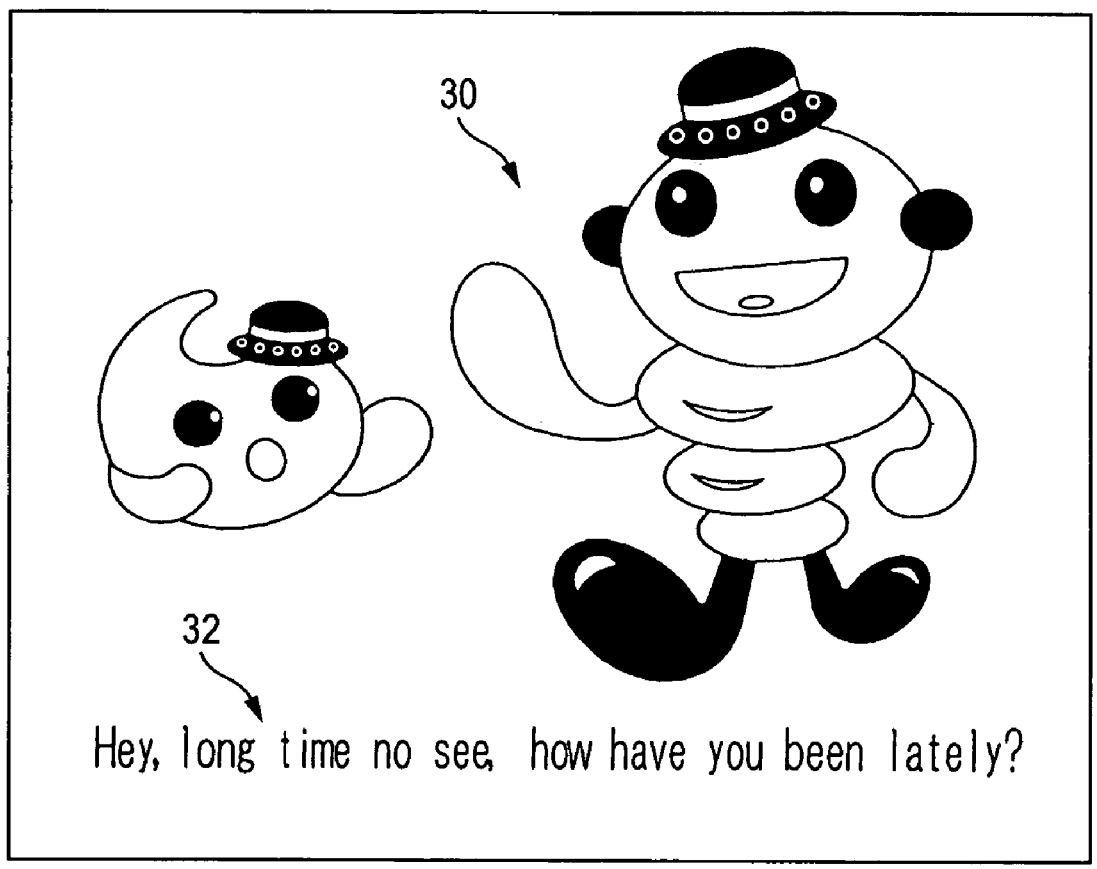
FIG. 4 shows an example of the image and subtitles displayed on the screen of the display.

Further, where the subtitle display based on the subtitle information has been set at OFF in the DVD player, even if the setting of subtitle display based on the closed caption information is ON, the setting is not turned OFF. In the case, the TV-IC 10 extracts the closed caption information from the composite signal Sa outputted from the DVD-IC 20 and outputs the OSD signal Sb on the basis of the closed caption information extracted. On the other hand, the composite signal Sa outputted from the DVD-IC 20 does not contain the subtitle information. Thus, the video signal processing circuit 13 creates the display signal Sc on the basis of the OSD signal Sb from the TV-IC 10 and the main video information in the composite signal Sa from the DVD-IC 20. As result, on the display 2, the subtitles based on the closed caption information as well as the main image are displayed. FIG. 4 shows an exemplary display in the case. In FIG. 4, reference numeral 30 denotes a main image, and reference numeral 32 denotes the subtitles (English) based on the closed caption information.

Further, even where the subtitle display based on the subtitle information has been set at ON in the DVD player, if the setting of subtitle display based on the closed caption information on the television receiver is OFF, the OSD signal Sb is not outputted from the TV-IC 10. The video signal processing circuit 13, therefore, creates the display signal Sc on the basis of the main video information and subtitle information contained in the composite signal Sa from the DVD-IC 20. As a result, on the display 2 of the CRT 14, as seen from FIG. 3, the subtitles 31 based on the subtitle information as well as the main image are displayed.

Figure 5:
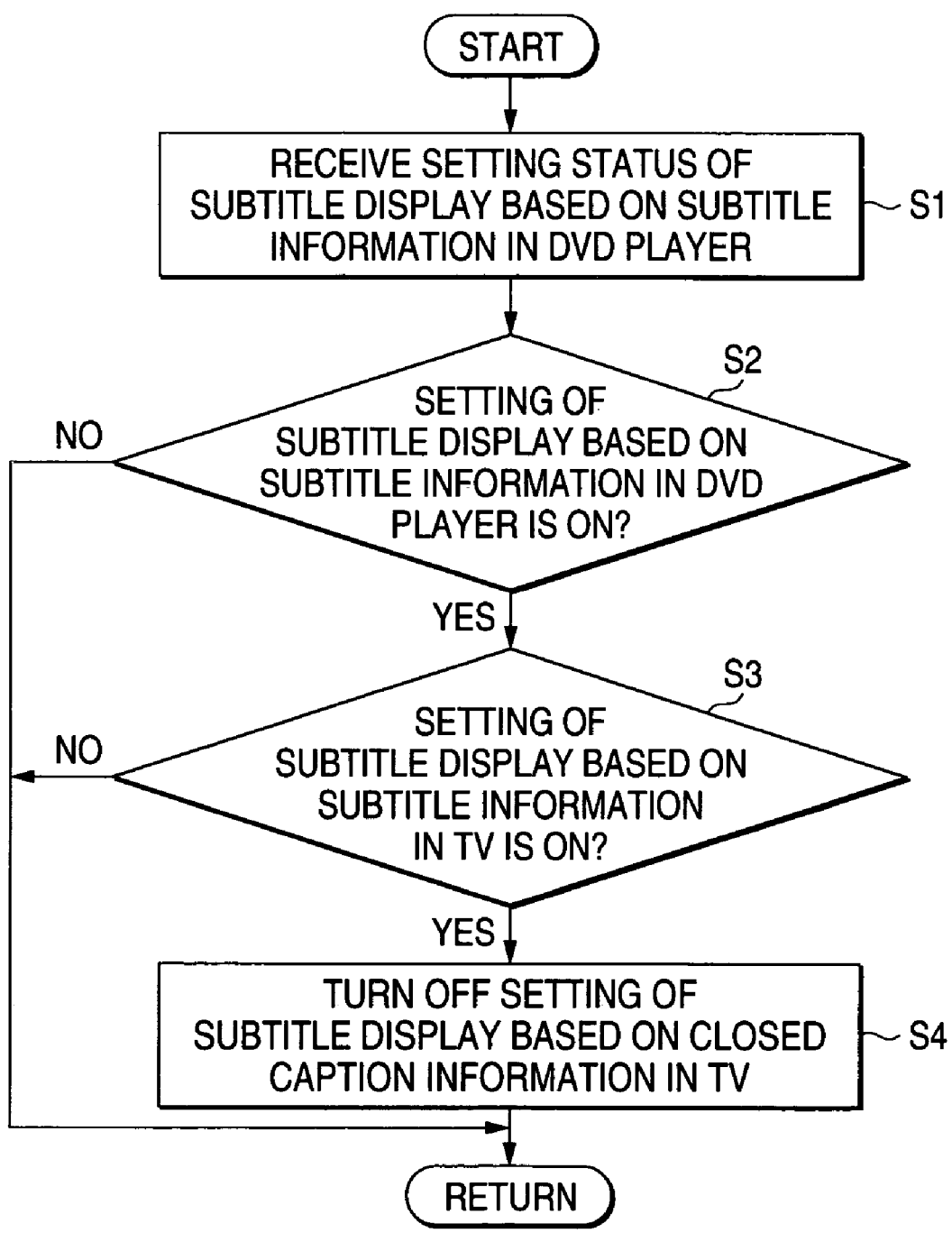
FIG. 5 is a flowchart showing the procedure of subtitle display.
Figure 6:
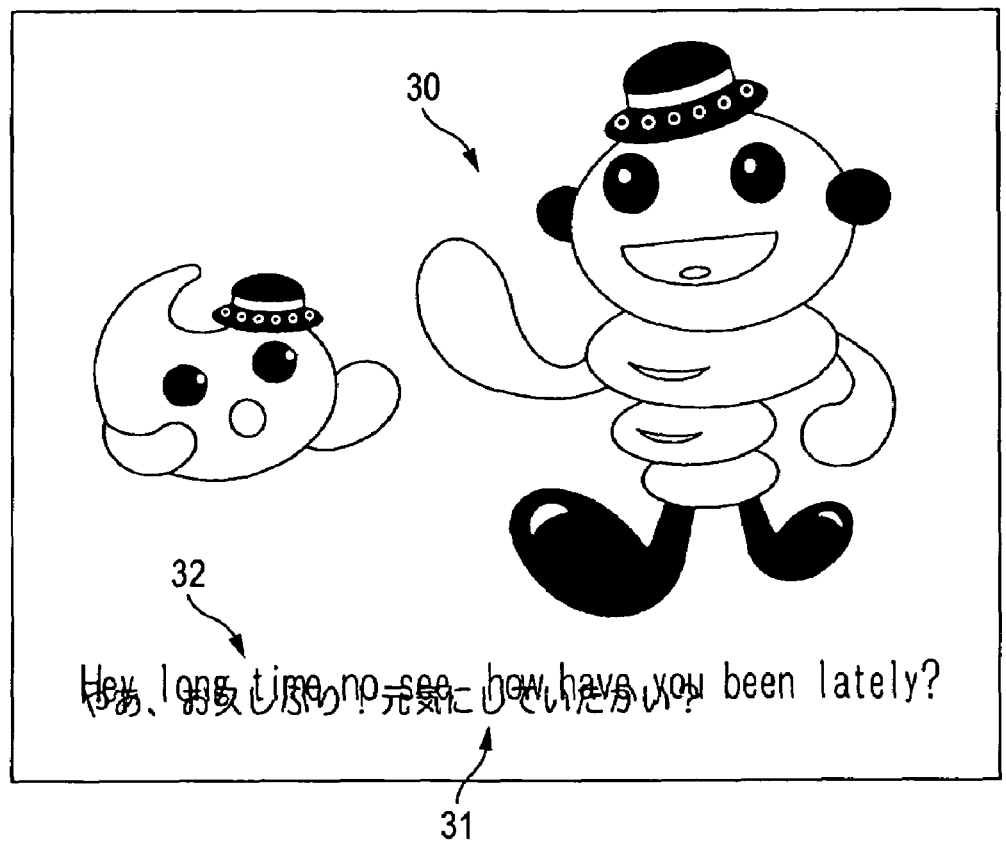
FIG. 6 shows an example of the image and subtitles for explaining a conventional art.

FIG. 5 is a flowchart indicating the operations described above, and shows a procedure to be executed by the microcomputer 11 provided on the TV-IC 10. First, when the microcomputer 11 receives a notice of the setting status of subtitle display based on the subtitle information from the microcomputer 21 through the serial bus 12 (step S1), the microcomputer 11 determines whether or not the setting is ON (step S2). If the setting is OFF (step S2: NO), the microcomputer 11 ends the procedure without executing the processing in each of steps S3 and S4. If the setting is ON (step S2: YES), the microcomputer 11 determines if the setting of subtitle display based on the closed caption information in the television receiver is ON (step S3). If the setting is OFF (step S3: NO), the microcomputer 11 ends the procedure without executing the processing in step S4. If the setting of subtitle display based on the closed caption information is ON (step S3: YES), the microcomputer 11 turns OFF the setting (step S4), thereby prohibiting the OSD signal Sb from being outputted from the TV-IC 10, as described above.

Thus, in the embodiment described above, if the subtitle display based on the subtitle information has been set at ON in the DVD player, the setting of the subtitle display based on the closed caption information on the television receiver is automatically turned OFF. For the reason, without the setting operation by a user, only the subtitles 31 based on the subtitle information are display on the screen of the display 2 and the two kinds of subtitles are not superposed. Further, using the bi-directional communication function of the serial bus 12, the TV-IC 10 can be informed of the setting status of the subtitle information in the DVD player from the DVD-IC 20. The microcomputer 11 in the TV-IC 10, therefore, determines whether the setting status acquired from the DVD-IC 20 is ON or OFF; if the setting is ON, the microcomputer 11 has only to turn OFF the setting of subtitle display based on the closed caption information. So the processing is very simple and no special circuit is required. In addition, since the display processing can be performed through software by the microcomputers 11 and 12, addition of hardware and changes therein are not required and the necessary software may be very simple, thereby suppressing an increase in the production cost.

Incidentally, in the embodiment described above, the subtitles 31 based on the subtitle information have been displayed in Japanese. It is needless to say that the subtitles may be displayed in English, French or other languages.

According to the embodiment, the subtitles based on the subtitle information can be precedently displayed without setting by a user. Further, since only the subtitles based on the subtitle information are displayed on the screen, difficulty of seeing owing to superposition of the subtitles can be avoided. In the case of the DVD player embedded type television set, unlike a discrete type television set, the TV-IC and the DVD-IC are connected to each other by the bus so that communication is made therebetween. For the reason, as described above, the TV-IC can be informed of the setting status of the subtitle information in the DVD player. Thus, the TV-IC determines if the setting status of subtitle display based on the subtitle information acquired from the DVD-IC is ON or OFF, and if it is ON, has only to turn OFF the setting of the closed caption information in the television receiver. So, no complicate processing is required and no special circuit is also required.

The TV-IC includes a first microcomputer, and the DVD-IC includes a second microcomputer. If the setting of subtitle display based on the subtitle information in the DVD player is ON, the first microcomputer turns OFF the setting of subtitle display based on the closed caption information to prohibit the OSD signal from being outputted from the TV-IC. Thus, since the processing of displaying the subtitles is entirely carried out by the microcomputers, it can be dealt with by only software. Addition of hardware and changes therein are not required and the necessary software may be very simple, thereby suppressing an increase in the production cost.

According to the embodiment, only the subtitles based on subtitle information can be automatically displayed without setting by a user so that difficulty of seeing of two kinds of subtitles owing to superposition thereof on a screen can be avoided. Using the feature of the DVD integral type television receiver set that communication can be made between the DVD-IC and the TV-IC, since the television receiver is informed of the setting status of subtitles in the DVD player, the satisfactory display of the subtitles can be carried out through a simple means with no complicate processing or circuit.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A television set embedded with a DVD player, which plays a DVD in which subtitle information and closed caption information are both recorded, the television set comprising:
   a display device;
   a first processor that generates, from a signal read from the DVD, a composite signal containing both of the subtitle information and the closed caption information;
   a second processor that extracts the closed caption signal from the composite signal, and generates an OSD signal from the extracted closed caption signal;
   a video signal processor that generates a display signal from the composite signal and outputs the display signal to the display device; and
   a data communication bus that connects the first processor and the second processor,
   wherein the first processor informs the second processor through the data communication bus whether or not a setting for displaying a subtitle based on the subtitle information is turned on,
   wherein the second processor turns off a setting for displaying a subtitle based on the closed caption information to prohibit outputting the OSD signal when informed by the first processor that the setting for displaying the subtitle based on the subtitle information is turned on,
   wherein the first processor is included in a microchip that includes a peripheral circuit that performs signal processing for the composite signal, and
   wherein the second processor is included in a microchip that includes a peripheral circuit that performs signal processing for the signal read from the DVD.

2. A television set embedded with a DVD player, which plays a DVD in which subtitle information and closed caption information are both recorded, the television set comprising:
   a first processor that generates, from a signal read from the DVD, a composite signal containing both of the subtitle information and the closed caption information;
   a second processor that extracts the closed caption signal from the composite signal, and generates an OSD signal from the extracted closed caption signal; and
   a data communication bus that connects the first processor and the second processor,
   wherein the first processor informs the second processor through the data communication bus whether or not a setting for displaying a subtitle based on the subtitle information is turned on, and
   wherein the second processor turns off a setting for displaying a subtitle based on the closed caption information when informed by the first processor that the setting for displaying the subtitle based on the subtitle information is turned on.

3. The television set according to claim 2, wherein the second processor turns off the setting for displaying the subtitle based on the closed caption information to prohibit outputting the OSD signal when informed by the first processor that the setting for displaying the subtitle based on the subtitle information is turned on.

4. The television set according to claim 2, wherein the first processor is included in a microchip that includes a peripheral circuit that performs signal processing for the composite signal.

5. The television set according to claim 2, wherein the second processor is included in a microchip that includes a peripheral circuit that performs signal processing for the signal read from the DVD.

6. The television set according to claim 2, further comprising:
   a display device; and
   a video signal processor that generates a display signal from the composite signal and outputs the display signal to the display device.

* * * * *